US008668971B2

(12) United States Patent
Suzuki et al.

(10) Patent No.: US 8,668,971 B2
(45) Date of Patent: Mar. 11, 2014

(54) MULTIPLE COMPARTMENT CONTAINER

(75) Inventors: Toyoaki Suzuki, Tokyo (JP); Koichi Miura, Tokyo (JP)

(73) Assignee: Fujimori Kogyo Co., Ltd., Tokyo (JP)

( * ) Notice: Subject to any disclaimer, the term of this patent is extended or adjusted under 35 U.S.C. 154(b) by 1177 days.

(21) Appl. No.: 10/548,622

(22) PCT Filed: Mar. 11, 2004

(86) PCT No.: PCT/JP2004/003179
§ 371 (c)(1),
(2), (4) Date: Sep. 9, 2005

(87) PCT Pub. No.: WO2004/080370
PCT Pub. Date: Sep. 23, 2004

(65) Prior Publication Data
US 2006/0165928 A1 Jul. 27, 2006

(30) Foreign Application Priority Data

Mar. 12, 2003 (JP) .................................. 2003-067125

(51) Int. Cl.
*B32B 27/32* (2006.01)
(52) U.S. Cl.
USPC ............ 428/35.7; 428/35.9; 206/219; 604/82
(58) Field of Classification Search
USPC .................. 428/516, 515, 478, 532, 364, 213, 428/475.8, 220; 524/404, 424, 430, 284; 210/693; 502/401; 525/217, 221
See application file for complete search history.

(56) References Cited

U.S. PATENT DOCUMENTS

| | | | | |
|---|---|---|---|---|
| 4,608,043 A | * | 8/1986 | Larkin | 604/87 |
| 5,766,699 A | * | 6/1998 | Ohtsuki et al. | 428/1.54 |
| 2003/0149148 A1 | * | 8/2003 | Hammond et al. | 524/284 |

FOREIGN PATENT DOCUMENTS

| | | |
|---|---|---|
| EP | 0980892 A1 | 2/2000 |
| JP | 62-252407 A | 11/1987 |
| JP | 3-726 A | 1/1991 |
| JP | 4-276253 A | 10/1992 |
| JP | 5-5138 U | 1/1993 |
| JP | 6-80792 A | 3/1994 |
| JP | 8-229101 A | 9/1996 |
| JP | 9-75424 A | 3/1997 |
| JP | 2675049 B2 | 7/1997 |
| JP | 2675075 B2 | 7/1997 |
| JP | 11-158061 A | 6/1999 |
| JP | 3016348 B2 | 12/1999 |
| JP | 2000-33111 A | 2/2000 |
| JP | 2000-70331 A | 3/2000 |
| JP | 2000-72925 A | 3/2000 |
| JP | 2000-86778 A | 3/2000 |
| JP | 2002-193816 A | 7/2002 |
| JP | 2003-19773 A | 1/2003 |
| JP | 2003-024415 | * 1/2003 |
| JP | 2003-24415 A | 1/2003 |
| JP | 2003-54574 A | 2/2003 |
| JP | 2003-128865 | * 5/2003 |
| JP | 2004-000476 | * 1/2004 |
| WO | 03/043895 A1 | 5/2003 |
| WO | WO03082549 | * 9/2003 |

OTHER PUBLICATIONS

Supplementary European Search Report for European Application No. 04719575.5, dated Apr. 2, 2012.

* cited by examiner

*Primary Examiner* — Ellen A Raudenbush
(74) *Attorney, Agent, or Firm* — Birch, Stewart, Kolasch & Birch, LLP

(57) ABSTRACT

A package with multiple chambers, wherein the inside of the package is partitioned into multiple chambers by a weak seal part(s) formed by sealing one sheet having a heat seal layer in at least one surface thereof and the other sheet having a heat seal layer in at least one surface thereof with the heat seal layers facing each other and sealing the peripheral edge parts thereof, and heat-pressing, from the outside of the package, a part of the inner surfaces of the walls of the package with the heat seal layers. The package is characterized in that both of two heat seal layers forming the inner surfaces of the walls include only a cyclic polyolefin resin as a resin ingredient.

10 Claims, No Drawings

MULTIPLE COMPARTMENT CONTAINER

TECHNICAL FIELD

The present invention relates to a package with multiple chambers in which multiple contents contained in the state of being isolated from each other by a weak seal part(s) (partition part) can be mixed with each other under a hermetically sealed condition by breaking the partition part at the time of use, and particularly to a package with multiple chambers in which interactions between the contents and the package inner wall, such as adsorption of a ingredient of the contents onto the package inner wall are reduced as possible, the elution of a low molecular weight component from an olefin resin, a printing ink, an adhesive or the like used for the package into the contents is reduced as possible, and which, with its good thermal resistance, is preferable particularly for medical use.

BACKGROUND ART

In the medical field, it is a general practice to preserve and distribute multiple drug ingredients in the state of being separately contained in packages and to mix the drug ingredients immediately before dosing. For example, as an infusion preparation for IVH, one that contains carbohydrates and amino acids as nutrition sources together with an electrolyte is used, and, in this case, since the liquid containing glucose sugar and the amino acids is liable to be denatured through the Maylard reaction, there is generally adopted a method in which the glucose sugar and the amino acids are contained in separate packages until they are mixed with each other immediately before dosing.

There have been applied a large number of packages with multiple chambers the inside of which is partitioned into multiple regions and which enables the above-mentioned mixing to be carried out in a sealed package (see, for example, Patent document 1: Japanese Patent No. 2675075; Patent document 2: Japanese Patent No. 2675049; Patent document 3: Japanese Utility Model Laid-open No. Hei 5-5138; and Patent document 4: Japanese Patent No. 3016348). Each of these relates to a package with multiple chambers in which the inside of the package is partitioned into multiple chambers by a weak seal part(s) provided at a part thereof, and, at the time of use, the weak seal part(s) is broken (broken through) by hands or with tools, whereby multiple contents therein can be mixed with each other under a hermetically sealed condition. Polyethylene and polypropylene are primarily used as a material of the seal layer, and provision of the weak seal part(s) at a part of a package by use of such a material can be carried out comparatively easily.

Here, in the case of preserving specified liquid contents, the use of a package with the seal layer formed of polyethylene or polypropylene may leads to a change in the composition of the liquid contents. To be more specific, in the case where a drug for dosing which contains a medicine such as infusion, medical liquid, radiographic agent, hormone agent, radioactive medicine, circulatory organ drug, digestive system preparation, protein amino preparation, circulatory system preparation, enzyme preparation, metabolic medicine, antibiotic, anti-inflammatory agent, tumor medicine, biological preparation, etc., or a vitamin agent or the like as an effective ingredient is the content liquid, a trace of an element (for example, manganese) or a vitamin or the like contained in the medicine or drug for dosing may be adsorbed on the package inside wall or may interact with the seal layer (olefin resin such as polyethylene and polypropylene), or, conversely, low molecular weight components such as additives or monomers eluted from the seal layer and other low molecular weight components of the printing inks or the adhesive may interact with the contents, with the result that perfect dosing of the effective ingredient cannot be achieved at the time of use.

As a package capable of preventing such an interaction between the effective ingredient of the contents and the package inner wall, there have been proposed packages using a cyclic polyolefin for the package inner wall (see, for example, Patent document 5: Japanese Patent Laid-open No. 2003-24415; Patent document 6: Japanese Patent Laid-open No. Hei 11-158061; and Patent document 7: Japanese Patent Laid-open 2002-193816). However, these packages are not ones designed on the assumption that the inside of the package is partitioned into multiple chambers. The cyclic polyolefin is a material very poor in seal property, and it is very difficult to partition the inside of these packages directly into multiple chambers (to provide the packages with a weak seal part(s) controlled in seal strength).

As a method for imparting a seal property to a cyclic polyolefin, a technology of contriving an enhanced heat seal property by mixing the cyclic polyolefin with a linear polyolefin is proposed in Patent document 8: Japanese Patent Laid-open No. 2000-70331.

However, when the linear polyolefin is mixed, adsorption of the effective ingredient onto the linear polyolefin is inevitable. Moreover, when the cyclic polyolefin is mixed with a linear polyolefin, transparency may be lowered, or the low molecular weight components such as additives and monomers contained in the linear polyolefin might be eluted into the contents, therefore, the packages thus obtained by the mixing still have room for improvement, particularly where the packages are for medical use.

Thus, there has been a request for a technology by which a suitable seal property necessary for forming the inner surfaces of the walls of a package with multiple chambers can be imparted to a cyclic polyolefin, without spoiling the characteristic features of the cyclic polyolefin, i.e., those features of the cyclic polyolefin by which the adsorption of the effective ingredient of the contents onto the cyclic polyolefin can be obviated, and by which it is ensured that even where olefin resin, printing ink, adhesive or the like is used in or on other layers than the heat seal layer forming the package inner surfaces of the walls, the elution of low molecular weight components of the olefin resin or the like from the other layers into the contents can be prevented from occurring.

The present invention has been made in consideration of the above-mentioned circumstances. Accordingly, it is an purpose of the present invention to provide a package with multiple chambers in which the package inner wall would not adsorb or hold an effective ingredient of the contents, by which it is ensured that, even where olefin resin, printing ink, adhesive or the like is used in or on other layers than the heat seal layer forming the package inner surfaces of the walls, the elution of low molecular weight components of the olefin resin or the like from the other layers into the contents can be prevented from occurring, and which, with the appropriate heat seal property and thermal resistance thereof, is preferable particularly for medical use.

DISCLOSURE OF INVENTION

The present inventor, in order to attain the above purpose, has made intensive and extensive investigations. As a result of the investigations, the inventor has found out that a package with multiple chambers having the inside thereof partitioned into multiple chambers by a weak seal part(s) formed by sealing one sheet having sealed peripheral edge parts formed by sealing one sheet having a heat seal layer in at least one surface thereof and another sheet having a heat seal layer in at least one surface thereof facing the heat seal layers each other, and having multiple chambers the inside thereof partitioned by weak seal part(s) made by heat-pressing from the outside of the package and bonding partly the inner surfaces of the walls of the package facing the heat seal layers each other, wherein both of the two heat seal layers forming the inner surface of the walls include only cyclic polyolefin resin(s) as a resin ingredient, ensures that adsorption or holding of an effective ingredient of the contents onto the package inner wall can be obviated, that, even where olefin resin, printing ink, adhesive or the like is used in other layers than the heat seal layers forming the package inner surfaces of the walls, the elution of low molecular weight components of the olefin resin or the like from the other layers into the contents can be prevented from occurring, and that the package can be a package having a weak seal property preferable for use as a package with multiple chambers and a thermal resistance preferable for use as a medical package. Based on the finding, the inventor has made the present invention.

Specifically, according to the present invention, there are provided the following packages with multiple chambers.

[I] A package with multiple chambers having sealed peripheral edge parts formed by sealing one sheet having a heat seal layer in at least one surface thereof and another sheet having a heat seal layer in at least one surface thereof facing the heat seal layers each other, and having multiple chambers the inside thereof partitioned by weak seal part(s) made by heat-pressing from the outside of the package and bonding partly the inner surfaces of the walls of the package facing the heat seal layers each other, wherein both of the two heat seal layers forming the inner surface of the walls include only cyclic polyolefin resin(s) as a resin ingredient.

[II] The package with multiple chambers as set forth in [I], wherein at least one of the two heat seal layers forming the inner surfaces of the walls include, as a resin ingredient, a mixture of cyclic polyolefin resins alone which includes (A) a cyclic polyolefin having a glass transition temperature of lower than 100° C., and (B) a cyclic polyolefin having a glass transition temperature of not lower than 100° C.

[III] The package with multiple chambers as set forth in [II], wherein the mixing ratio (A)/(B) of the (A) cyclic polyolefin having a glass transition temperature of lower than 100° C. to the (B) cyclic polyolefin having a glass transition temperature of not lower than 100° C. is in the range of from 2/98 to 70/30 (in weight).

[IV] The package with multiple chambers as set forth in [II] or [III], wherein the gap in glass transition temperature between the (A) cyclic polyolefin having a glass transition temperature of lower than 100° C. and the (B) cyclic polyolefin having a glass transition temperature of not lower than 100° C. is not lower than 20° C.

[V] The package with multiple chambers as set forth in any one of [I] to [IV], wherein the cyclic polyolefin resin has a structural unit or units represented by the following general formula (1) and/or general formula (2):

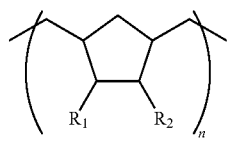

(1)

-continued

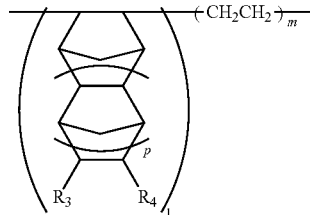

(2)

In the formula, $R_1$, $R_2$, $R_3$ and $R_4$ are the same or different organic groups having 1 to 20 carbon atoms, the pair of groups $R_1$ and $R_2$ and/or the pair of groups $R_3$ and $R_4$ may form a ring, each of m and p is an integer of 0 or more, and each of l and n is an integer of 1 or more.

[VI] The package with multiple chambers as set forth in any one of [I] to [V], wherein the cyclic polyolefin resin is a polynorbornene resin.

[VII] The package with multiple chambers as set forth in any one of [I] to [VI], wherein the weak seal part(s) is formed by inserting a tape, which has in a surface layer thereof at least a layer including (A) a cyclic polyolefin resin having a glass transition temperature of lower than 100° C. and/or (B) a cyclic polyolefin resin having a glass transition temperature of not lower than 100° C., between the walls facing each other, and heat-pressing and bonding relevant position from the outside of the package.

[VIII] The package with multiple chambers as set forth in any one of [I] to [VII], wherein the temperature of high pressure steam sterilization tested according to the 14th amended Japanese Pharmacopoeia is not lower than 105° C.

The package with multiple chambers according to the present invention is a package with multiple chambers in which multiple contents contained in the state of being isolated from each other by a weak seal part(s) (partition part) can be mixed with each other under a hermetically sealed condition by breaking the partition part at the time of use, in which interactions between the contents and the package inner wall, such as adsorption of a ingredient of the contents onto the package inner wall are reduced as possible, by which it is ensured that even where olefin resin, printing ink, adhesive or the like is used in or on other layers than the heat seal layers forming the package inner surfaces of the walls, the elution of low molecular weight components of the olefin resin or the like from the other layers into the contents can be prevented from occurring, and which has an appropriate heat seal property as a package with multiple chambers and a thermal resistance preferable for use as a medical package.

BEST MODE FOR CARRYING OUT THE INVENTION

Now, the present invention will be described more in detail.

The package with multiple chambers according to the present invention is a package with multiple chambers having sealed peripheral edge parts formed by sealing one sheet having a heat seal layer in at least one surface thereof and another sheet having a heat seal layer in at least one surface thereof facing the heat seal layers each other, and having multiple chambers the inside thereof partitioned by weak seal part(s) made by heat-pressing from the outside of the package and bonding partly the inner surfaces of the walls of the package facing the heat seal layers each other, wherein both of the two heat seal layers forming the inner surface of the walls include only cyclic polyolefin resin(s) as a resin ingredient.

Since the heat seal layers including only the cyclic polyolefin resin as a resin ingredient are used for forming the inner surfaces of the walls, the package with multiple chambers according to the present invention is a package in which adsorption of ingredients of the contents onto the package inner surface of the walls is obviated, the interactions between the contents and the package are reduced as possible, and, even where olefin resin, printing ink, adhesive or the like is used in or on other layers than the heat seal layers forming the package inner surfaces of the walls, the elution of low molecular weight components of the olefin resin or the like from the other layers into the contents can be prevented from occurring. Moreover, since it is possible to impart an appropriate seal strength to the weak seal part(s) provided and it is possible to securely isolate the multiple contents from each other during preservation of the contents and to easily brake only the partition wall partitioning the inside of the package into the multiple chambers at the time of using the contents through mixing them, the package is a package with multiple chambers rich in practicality which is capable of mixing the plurality of contents in a sealed condition.

The cyclic polyolefin resin is preferably a cyclic polyolefin resin composition including the following ingredients (A) and (B):

(A): A cyclic polyolefin having a glass transition temperature of lower than 100° C., and (B): A cyclic polyolefin having a glass transition temperature of not lower than 100° C., from the viewpoint of forming the weak seal part(s) displaying the function as the package with multiple chambers. Besides, in the present invention, it is preferable for at least one of the heat seal layers forming the package inner surfaces of the walls to be formed of such a cyclic polyolefin resin composition, from the viewpoint of forming the weak seal part(s) displaying the function as the package with multiple chambers.

Incidentally, the expression "glass transition temperature" in the present invention means a value measured according to JIS K7121 (DSC).

The mixing ratio of ingredient (A) and ingredient (B), in terms of [ingredient A]]/[ingredient (B)] (in mass), is ordinarily in the range of from 2/98 to 70/30, preferably from 5/95 to 65/35. When the mixing amount of ingredient (A) is too large, a sufficient thermal resistance may not be maintained and the package may be deformed at the time of sterilization; on the other hand, if the mixing amount is too small, the temperature range in which the weak seal part(s) can be formed may not be secured sufficiently.

The glass transition temperature of ingredient (A) is lower than 100° C., preferably not more than 95° C., and more preferably not more than 90° C. On the other hand, the glass transition temperature of ingredient (B) is not lower than 100° C., preferably not lower than 115° C., and more preferably not lower than 120° C.

In addition, the glass transition temperature gap between the glass transition temperature of ingredient (A) and that of ingredient (B) is ordinarily not lower than 20° C., preferably not lower than 25° C., and more preferably not lower than 30° C. If the temperature gap is lower than 20° C., the temperature range for a sufficient weak seal may not be obtainable and a stable weak seal may not be obtainable.

Here, ingredient (A) and ingredient (B) are obtained by polymerization of a monomer composition containing a cyclic polyolefin monomer. Examples of the cyclic olefin monomer to be used in the present invention include monocyclic cycloolefins such as cyclobutene, cyclopentene, cyclooctene, cyclododecene, etc. and their derivatives having a substituent group or groups, and substituted or unsubstituted dicyclic or tricyclic or higher polycyclic olefin monomers having a norbornene ring (hereinafter sometimes referred to as norbornene-based monomers). Of these monomers, preferred are the norbornene-based monomers, from the viewpoints of productivity of the container and adaptability to contents.

As the monomer composition, the cyclic olefin monomer only may be used as the raw material monomer, and other monomer(s) may be used together within such a range as not to spoil the purpose of the present invention. As the cyclic olefin monomer, one monomer may be used singly, but use of two or more monomers together is preferable. By use of two or more cyclic olefin monomers together, for example, by use of an appropriate combination of a monomer having one double bond which is to be a thermoplastic resin and a monomer having more than one double bond which is to be a thermosetting resin, it is possible to produce cyclic polyolefin resins with various physical properties. Further, the use of more than one kind of monomers together is expected to adjust a solidification point, which is preferable from the viewpoint that the range in which the monomers can be treated as liquids may be broadened.

Specific examples of the norbornene-based monomer include dicyclic cycloolefins such as norbornene, norbornadiene, methylnorbornene, dimethylnorbornene, ethylnorbornene, chlorinated norbornene, chloromethylnorbornene, trimethylsilylnorbornene, phenylnorbornene, cyanonorbornene, dicyanonorbornene, methoxycarbonylnorbornene, pyridylnorbornene, nadic anhydride, nadic acid imide, etc.; tricyclic cycloolefins such as dicyclopentadiene, dihydrodicyclopentadiene and alkyl, alkenyl, alkylidene and aryl substitution products thereof; tetracyclic cycloleins such as dimethanohexahydronaphthalene, dimethanooctahydronaphthalene and alkyl, alkenyl, alkylidene and aryl substitution products thereof; pentacyclic cycloolefins such as tricyclopendadiene; and hexacyclic cycloolefins such as hexacycloheptadecene, etc. In addition, compounds including norbornene rings such as dinorbornene, compounds obtained by linking two norbornene rings by a hydrocarbon chain or an ester group or the like, and alkyl and aryl substitution products thereof, etc. and the like can also be used.

On the other hand, examples of the above-mentioned other monomer include α-olefins having two or more carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicocene, and the like. These monomers may be used singly or in combination. In these monomers, preferred as the other monomer are ethylene and propylene, and particularly preferred is ethylene.

Where the cyclic olefin monomer and the other monomer are used together, the mixing ratio in terms of (cyclic olefin monomer)/(other monomer) (in mass) is ordinarily in the range of from 98/2 to 30/70, preferably from 95/5 to 40/60. When the mixing amount of the cyclic olefin monomer is too large, a sufficient seal property may not be obtainable; on the other hand, when the mixing amount is too small, the non-adsorption property of the ingredients of the contents may be insufficient.

As a polymerization method in the case of using more than one kind of monomers together, any of known methods can be used. A method of blending the monomers followed by copolymerization may be adopted, and a method of conducting polymerization to a certain degree followed by blending of the monomer(s) and by block copolymerization may also be adopted. Besides, ring-opening polymerization may be used, and addition polymerization may also be used.

In consideration of the purpose of the present invention, and from the viewpoint of moisture impermeability, it is preferable to obtain the cyclic polyolefin resin by using only a monomer or monomers not including a polar group; however, a partially polar monomer or monomers can be used together within such a range as not to spoil the purpose of the present invention. Examples of such a polar monomer include substitution products obtained by adopting a halogen group such as chlorine and bromine or an ester group to the above-mentioned norbornene-based monomers. It should be noted, however, that as the mixing ratio of the polar monomer is increased, the moisture absorptivity and moisture permeability of the polymer obtained are increased, and, therefore, the proportion of the polar monomer based on the monomer composition is ordinarily not more than 30% by weight.

Besides, it is preferable that the cyclic polyolefin resin for use in the present invention is used as a resin having no unsaturated bond which is obtained by conducting hydrogen addition after polymerization of the above-mentioned monomer composition, from the viewpoints of enhancing adaptability to sterilization and preventing an addition reaction or an oxidation reaction.

As ingredient (A) and ingredient (B) for use in the present invention, preferred are cyclic polyolefins obtained by conducting hydrogen addition after polymerization of one or more cyclic olefin monomer compositions selected from the group consisting of dicyclopentadiene, norbornene, and tetrcyclodecene, from the viewpoints of medical use, such as infusion bag, and the like.

The specific structure of the cyclic polyolefin resin for use in the present invention is not particularly limited; from the viewpoints of medical use, such as infusion bag, and the like, the structure preferably has a structural unit or units represented by the following general formula (1) and/or (2):

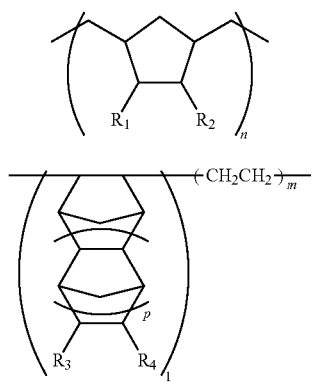

In the formula, $R_1$, $R_2$, $R_3$ and $R_4$ are the same or different organic groups having 1 to 20 carbon atoms, the pair of groups $R_1$ and $R_2$ and/or the pair of groups $R_3$ and $R_4$ may form a ring, each of m and p is an integer of 0 or more, and each of l and n is an integer of 1 or more.

More specific examples of the organic groups having 1 to 20 carbon atoms include, but are not limited to, alkyl groups such as methyl, ethyl, n-propyl, i-propyl, n-butyl, i-butyl, sec-butyl, t-butyl, i-pentyl, t-pentyl, n-hexyl, n-heptyl, n-octyl, t-octyl (1,1-dimethyl-3,3-dimethylbutyl), 2-ethylhexyl, nonyl, decyl, undecyl, dodecyl, tridecyl, tetradecyl, pentadecyl, hexadecyl, heptadecyl, octadecyl, nonadecyl, cyclooctyl, etc.; cycloalkyl groups such as cyclopentyl, cyclohexyl, cycloheptyl, cyclooctyl, etc.; alkylcycloalkyl groups such as 1-methylcyclopentyl, 1-methylcyclohexyl, 1-methyl-4-i-propylcyclohexyal, etc.; alkenyl group such as allyl, propenyl, butenyl, 2-butenyl, hexenyl, cyclohexenyl, etc.; aryl groups such as phenyl, naphthyl, methylphenyl, methoxyphenyl, biphenyl, phenoxyphenyl, chlorophenyl, sulfophenyl, etc.; and aralkyl groups such as benzyl, 2-phenylethyl (phenethyl), α-methylbenzyl, α,α-dimethylbenzyl, etc. These organic groups may be used singly or in combination of two or more thereof.

The glass transition temperature of the cyclic polyolefin resin in the present invention can be controlled as required, by regulating the values of l, m, n, and p in the above-mentioned general formulas (1) and (2), the molecular weights of the structural units represented by the general formulas (1) and (2), the combination of the cyclic olefin monomers, and the like.

As the cyclic polyolefin having the structural unit represented by the general formula (1), there can be used commercially available ones; for example, ZEONEX and ZEONOR produced by ZEON Corporation can be used preferably.

As the cyclic polyolefin having the structural unit represented by the general formula (2), there can be used commercially available ones; for example, APEL produced by Mitsui Chemicals, Inc. and TOPAS produced by TICONA can be used preferably.

Where a cyclic polyolefin resin composition including more than one cyclic polyolefin resin is used as the cyclic polyolefin resin in the present invention, the mixing of the resins can be conducted by utilizing an ordinarily known uniaxial or biaxial melt mix extruder or static melt mixer.

Incidentally, the cyclic polyolefin resin may be admixed with various additives, for example, pigment, dispersant, anti-oxidant, UV absorber, light stabilizer, inorganic filler, etc. in such ranges as not to spoil the purpose of the present invention.

While the package with multiple chambers of the present invention has the inner surfaces of the walls formed of the heat seal layers including only the above-mentioned cyclic polyolefin resin as a resin ingredient, other parts than the inner surfaces of the walls are not particularly limited; the package may have an outer surfaces of the walls, and may further have one or more intermediate layers between the outer surfaces of the walls and the inner surfaces of the walls.

The materials of the outer surfaces of the walls or the intermediate layer(s) are not particularly limited, and these parts can be formed by use of known materials such as thermoplastic resins, thermosetting resins, metals, ceramics, etc. Among these materials, thermoplastic resins are preferably used from the viewpoint of processability. Particularly, from the viewpoints of production cost and visibility of the contents and from the viewpoint of preventing the deterioration of the contents, there are preferably used polyolefins such as polyethylene, polypropylene, etc., polyesters such as polyethylene terephthalate, polybutylene terephthalate, etc., polyamides such as nylon, etc., polyurethane, ethylene-vinyl alcohol copolymer, polyvinylidene chloride, polyacrylonitrile, polyvinyl alcohol, etc. and elastomers obtained by single-stage or multi-stage polymerization thereof, and so on.

The package with multiple chambers having sealed peripheral edge parts formed by sealing tow sheets each having a heat seal layer two sheets each having a heat seal layer containing only the above-mentioned cyclic polyolefin resin as a resin ingredient in at least one surface thereof facing the heat seal layers each other, and having multiple chambers the inside thereof partitioned by weak seal part(s) made by heat-pressing from the outside of the package and bonding partly the inner surfaces of the walls of the package facing the heat seal layers each other.

As the method of producing the sheet having the heat seal layer in at least one surface thereof, there can be adopted a known method. For example, a monolayer or multilayer sheet may be extruded by use of a monolayer or multilayer T die or circular die, and the flat sheet, a tubular sheet, a parison or the like obtained may be formed into a monolayer or multilayer sheet having predetermined shape or form by appropriately utilizing such techniques as thermo-forming, blowing, orientation, cutting, and fusing. Besides, in the case of configuring a multilayer sheet, there can be appropriately used together a method for dry lamination of the layers by use of an adhesive, a method of melt lamination by use of a meltable resin, and the like methods.

In manufacturing the package with multiple chambers, at the time of forming the partition wall part (the above-mentioned weak seal part(s)) between the multiple chambers, the seal strength is preferably a seal strength at such a level that the rupture of the weak seal part(s) is not liable to occur during manufacture or transportation but the rupture of the weak seal part(s) can be easily broken by hands or with tools at the time of use (at the time of mixing) (the seal strength (180° peel strength) according to JIS Z 0238 is ordinarily not lower than 0.5 N/15 mm, preferably not less then 0.8 N/15 mm, with an upper limit of ordinarily not more than 10 N/15 mm, preferably not more than 5 N/15 mm). The weak seal part(s) in the package with multiple chambers of the present invention is provided by heat-pressing a part of the facing inner surfaces of the walls from the outside of the package, and the conditions of temperature, pressure and time for the heat-pressing are appropriately set so that the above-mentioned seal strength can be attained.

In the specific seal conditions to form the weak seal part(s), for example, a temperature is ordinarily 120 to 220° C., preferably 140 to 200° C., a pressure is ordinarily 0.1 to 0.6 MPa, preferably 0.1 to 0.4 MPa, more preferably 0.2 to 0.3 MPa, and a time is ordinarily 1 to 6 sec, preferably 2 to 4 sec. If the seal conditions come out of the above-mentioned ranges, there may arise a case where an appropriate weak seal part(s) cannot be formed, a case where the seal part is poor in appearance quality, or a case where productivity is low. Incidentally, when the weak seal part(s) is formed, the width of the seal part(s) is ordinarily 2 to 10 mm.

Incidentally, the number of the chambers belonging to the package with multiple chambers of the present invention is determined depending on the number of the weak seal part(s) provided, and is not particularly limited; the number of the chambers is ordinarily 2 to 5.

In the present invention, the weak seal part(s) may be formed by inserting a tape, which has in a surface layer thereof at least a layer including the above-mentioned ingredient (A) and/or ingredient (B) between the facing inner surfaces of the walls, and heat-pressing and bonding relevant position from the outside of the package. With the weak seal part(s) formed in this manner, not only a weak seal part(s) having a stable seal strength can be provided more securely but also the range of sealing temperature at the time of providing the weak seal part(s) can be set wider, so that the same conditions (temperature, pressure, time) for providing a strong seal parts at the peripheral edge parts of the package can be applied at the time of providing the weak seal part(s), and, therefore, the strong seal parts and the weak seal part(s) can be provided simultaneously, which is advantageous from the viewpoint of manufacturing cost of the package with multiple chambers.

Incidentally, the surface layer of the tape here may be formed by using, in addition to the above-mentioned ingredient (A) and/or ingredient (B), other thermoplastic resin, for example, polyethylene, polypropylene or the like together.

In the package with multiple chambers of the present invention, the seal strength of other seal part than the weak seal part(s), for example, the peripheral edge parts or a port part of the package is preferably a seal strength at such a level as to prevent easy rupture of the relevant part (a seal strength (180° peel strength) according to JIS Z 0238 of ordinarily not lower than 15 N/15 mm, preferably not lower than 20 N/15 mm). In the case of sealing the peripheral edge parts or port part of the package by heat sealing, specific seal conditions for realizing the above-mentioned seal strength are, for example, a heat-pressing ordinarily 150 to 260° C., preferably 180 to 230° C., a heat-pressing pressure of ordinarily 0.1 to 0.6 MPa, preferably 0.2 to 0.5 MPa, and a heat-pressing time of ordinarily 1 to 6 sec, and preferably 2 to 4 sec. If the seal conditions come out of the above-mentioned ranges, there may arise a case where an appropriate peripheral seal cannot be formed, a case where the seal part is poor in appearance quality, or a case where productivity is low. And when the peripheral seal part is formed, the width of seal parts is ordinarily 2 to 30 mm.

In the manufacturing of the package with multiple chambers of the present invention, the method for sealing other parts than the weak seal part(s) is not particularly limited, and a sealing method using an adhesive in such a range as not to spoil the purpose of the invention may also be adopted. Incidentally, the term "heat-pressing" in the present invention includes high-frequency sealing and ultrasonic sealing, other than the above-mentioned heat sealing. The high-frequency sealing and the ultrasonic sealing can be deemed as equivalent to the heat sealing, in the meaning that the heat-pressing is effected by bringing polymer chains into thermal motion. The high-frequency sealing makes it possible to simultaneously perform fusing and cooling in a single sealing operation, and can therefore be preferably used particularly in the case of sealing at a high temperature of not lower than 200° C., in the case of sealing the port part, in the case of forming the weak seal part(s), and the like.

The package with multiple chambers of the present invention preferably has a port member, from the viewpoint of ensuring easy pouring of the contents. It is preferable, from the viewpoints of adaptability to high-pressure steam sterilization and of ensuring port fusing in such a manner as not to generate liquid leakage, it is preferable that the port member is a port member formed of a composition containing as a main ingredient a cyclic olefin resin having a glass transition temperature of 100 to 140° C., or a port member formed of the same constituent material as that of the above-mentioned heat seal layer.

Here, the glass transition temperature of the cyclic polyolefin resin contained as a main ingredient in the composition for forming the port member is ordinarily 100 to 140° C., preferably 105 to 120° C. If the glass transition temperature is lower than 100° C., sealing itself is easy to achieve, but a high-pressure steam sterilization treatment at not lower than 110° C. may lead to deformation of the port or to leakage of liquid. On the other hand, if the glass transition temperature exceeds 140° C., the port member itself becomes hard, is difficult to soften, and is difficult to fuse, and it becomes necessary for securely fusing the port member to apply an excessive heat from the outside of the packaging bag; as a result, there may arise deformation of the film, rupture of the film itself by sealing, or leakage of liquid via the sealed part of the port member.

Incidentally, the proportion of the cyclic polyolefin resin having a glass transition temperature of 100 to 140° C. based on the composition for forming the port member is ordinarily not lower than 50% by weight, preferably not lower than 70% by weight, more preferably 80% by weight, and can be 100% by weight.

From the viewpoints of enhancing the softness of the port member to facilitate the fusing of the port member, or preventing liquid leakage or the like, a thermoplastic elastomer may be mixed in the composition for forming the port member in a mixing ratio of not more than 20% by weight. The proportion of the thermoplastic elastomer based on the composition for forming the port member is ordinarily not more than 20% by weight, preferably not more than 15% by weight, and more preferably not more than 10% by weight. If the proportion exceeds 20% by weight, the possibility of adsorption of the ingredients of the contents onto the port member may increase, or the package with multiple chambers may be poor in adaptability to high-pressure steam sterilization.

In the case where contents required sterilization are contained in the package with multiple chambers of the present invention, in order to make it possible that sterilization by heat, particularly, a high-pressure steam sterilization treatment can be stably carried out in the condition where the contents are contained in the package, it is preferable that the thermal resistance of the package with multiple chambers of the present invention is not lower than 105° C. in the test of package thermal resistance based on the 14th amended Japanese Pharmacopoeia. The heat-pressing conditions and the material of the outer surfaces of the walls, the intermediate layer(s) and/or the like are appropriately selected, to ensure that the package with multiple chambers of the present invention will show the above-mentioned characteristics.

Since the package with multiple chambers of the present invention has the inner surfaces of the walls formed of the cyclic polyolefin, even in the case where the medicines including very small amount of elements or the like as effective ingredients, for example, elements such as manganese, iron, zinc, copper, iodine, etc. or ions thereof, vitamins (various vitamins such as vitamin A, vitamin B, vitamin C, vitamin D, vitamin E, etc.), or medicines or vitamin agents or the like containing the elements or ions, such as infusion, liquid medicine, radiographic agent, hormone agent, radioactive medicine, circulatory organ medicine (isosorbitol nitrate, nitroglycerine), digestive system preparation, protein amino preparation, circulatory system preparation, enzyme preparation, metaboric medicine, antibiotic, anti-inflammation agent, tumor medicine, biological agent, etc., which would be adsorbed on the inner surfaces of the walls when the inner surface of the walls is formed of an ordinary linear polyolefin such as polyethylene and polypropylene, are used as the liquid contents in the package with multiple chambers, the package is free of the possibility of adsorption of the ingredients onto the inner surfaces of the walls thereof or the possibility of interactions between the ingredients and an olefin resin such as polyethylene and polypropylene, and is free of the possibility that low molecular weight components such as additives and monomers eluted from the outer surfaces of the walls, the intermediate layer(s) and/or the like of the package and low molecular weight components of printing inks, adhesives and/or the like might interact with the contents; therefore, the package with multiple chambers of the present invention is preferable particularly in the cases of preservation and use of various fluid foods, nutrition agents, medicines and the like.

EXAMPLES

Now, the present invention will be specifically described while showing Examples and Comparative Example below, but the present invention is not to be construed as limited to the following Examples.

Examples 1-6, Comparative Example 1

First, materials for constituting the surface layer, the intermediate layer, the heat seal layer, and the port part was obtained with the compositions shown in Table 1.

TABLE 1

| | Tg (°C.) | Material Parts by weight | | | | | | | | | | | |
| --- | --- | --- | --- | --- | --- | --- | --- | --- | --- | --- | --- | --- | --- |
| | | a | b | c | d | e | f | g | h | i | j | k | l | m |
| ZEONOR 750R | 75 | 20 | | 30 | | | 20 | | | | | 10 | | 80 |
| ZEONOR 1420R | 136 | | 80 | | | | | | 80 | | 100 | 90 | 80 | 20 |
| ZEONOR 1020R | 105 | | | 100 | | | | 80 | | 90 | | | | |
| ZEONOR 1410R | 136 | | | | 70 | | | | | | | | | |
| APEL APL8008T | 70 | | | | | | | | 20 | | | | | |
| MORETEC 3500Z | — | 100 | | | | | | | | | | | 20 | |
| ZELAS 7023 | — | | | | | 100 | | | | | | | | |
| DYNARON | — | | | | | | | | | 10 | | | | |
| MODIC F534A | — | | | | | | 100 | | | | | | | |

ZEONOR 750R, 1420R, 1020R, 1410R
Cyclic polyolefin produced by ZEON Corporation
APEL APL8008T
Cyclic polyolefin produced by Mitsui Chemicals, Inc.
MORETEC 3500Z
LLDPE produced by Idemitsu Petrochemical Co., Ltd.
ZELAS 7023
Polypropylene-based elastomer produced by Mitsubishi Chemical Corporation
DYNARON 1320P
Styrene-based elastomer produced by JSR Corporation
MODIC F534A
Adhesive resin produced by Mitsubishi Chemical Corporation Next, one sheet and the other sheet were produced by a multilayer co-extrusion method using the above-mentioned predetermined materials, and the port part was produced by injection molding using the above-mentioned predetermined material. The one sheet and the other sheet thus obtained were sealed with each other, with their heat seal layers facing to each other, the port part was inserted to a predetermined position of peripheral edge parts of the sheets, peripheral edge parts of the sheets and the port part were heat sealed, and a part of inner surface of the walls of the package was heat-pressed from the outside of the package to provide a weak seal part so that the inside of the package was equally bisected, to produce a package with multiple chambers of 80 mm×150 mm in overall size. The sealing conditions for the peripheral seal part and the port seal part of the package with multiple chambers are given in Table 2.

For the packages with multiple chambers obtained above, the heat seal strength of the outer peripheral seal part and the weak seal part were measured. Then, after the packages with multiple chambers were filled with the predetermined volume of the contents shown in Table 2 and were sealed hermetically, a sterilization treatment was conducted in an autoclave under the predetermined sterilization conditions shown in Table 2, and it was checked whether the weak seal part was sustained or not. Besides, in the subsequent break through test, it was evaluated whether applying a load with hand could easily break the weak seal part. The results are shown together in Table 2.

TABLE 2

|  |  |  | Example |  |  |  |  |  | Comparative Example |
|---|---|---|---|---|---|---|---|---|---|
|  |  |  | 1 | 2 | 3 | 4 | 5 | 6 | 1 |
| Constituent materials | One sheet | Surface layer | a | a | e | e | e | e | e |
|  |  | Surface layer thickness (μm) | 230 | 230 | 200 | 200 | 190 | 190 | 200 |
|  |  | Intermediate layer | — | — | f | f | f | f | f |
|  |  | Intermediate layer thickness (μm) | — | — | 30 | 30 | 30 | 30 | 30 |
|  |  | Seal layer | b | d | b | h | j | j | m |
|  |  | Seal layer thickness (μm) | 20 | 20 | 20 | 20 | 30 | 30 | 20 |
|  | Other sheet | Surface layer | a | a | e | e | e | e | e |
|  |  | Surface layer thickness (μm) | 230 | 230 | 200 | 200 | 190 | 190 | 200 |
|  |  | Intermediate layer | — | — | f | f | f | f | f |
|  |  | Intermediate layer thickness (μm) | — | — | 30 | 30 | 30 | 30 | 30 |
|  |  | Seal layer | b | d | b | h | j | k | l |
|  |  | Seal layer thickness (μm) | 20 | 20 | 20 | 20 | 30 | 30 | 20 |
|  | Port part |  | c | c | g | i | c | c | m |
| Evaluation results | Seal test | Sealing conditions 1 (° C. × sec) | 220 × 4 | 210 × 4 | 220 × 4 | 230 × 3 | 230 × 5 | 230 × 5 | 200 × 4 |
|  |  | Strength of peripheral seal part (N/15 mm) | 25 | 30 | 30 | 30 | 25 | 25 | 30 |
|  |  | Sealing conditions 2 (° C. × sec) | 200 × 4 | 185 × 4 | 190 × 3 | 195 × 2 | 165 × 2 | 175 × 2 | 160 × 3 |
|  |  | Strength of weak seal part (N/15 mm) | 2 | 3 | 2 | 2 | 2 | 2 | — |
|  | Sterilization treatment test | Contents | water for injection | | | | | | |
|  |  | Amount of contents (ml) | 100 | 100 | 300 | 100 | 100 | 100 | 100 |
|  |  | Sterilization conditions (° C. × min) | 110 × 40 | 110 × 40 | 121 × 30 | 121 × 30 | 121 × 30 | 121 × 30 | 110 × 30 |
|  |  | Whether weak seal part was maintained or not | ◯ | ◯ | ◯ | ◯ | ◯ | ◯ | X |
|  |  | Pitting test Appearance | ◯ | ◯ | ◯ no abnormality | ◯ | ◯ | ◯ | — liquid leakage |

Sealing Condition 1
  Sealing condition for peripheral part and port seal part (sealing pressure: 0.4 MPa)
Sealing Condition 2
  Sealing condition for weak seal part (sealing pressure: 0.4 MPa)
Strength of Seal Parts
  Seal strength (180° peel strength) according to JIS Z 0238.
Whether Weak Seal Parts Were Sustained or Not
  After a sterilization treatment conducted in an autoclave under the predetermined conditions of temperature and time, the packages with multiple chambers were taken out of the autoclave, and it was evaluated according to the following criteria whether the weak seal parts were sustained or not.
  ◯: It was visually confirmed that the weak seal part was perfectly sustained.
  x: It was visually confirmed that the weak seal part had been broken.
Break Through Test
  The packages with multiple chambers taken out of the autoclave after the sterilization treatment were evaluated according to the following criterion.

○: Applying a load by hands could break through the weak seal part, and an opening in the inside of the package could be achieved.

The innermost layer of the package with multiple chambers of Comparative Example 1 contained polyethylene, so that the effective ingredients of the contents was liable to be adsorbed on the inner wall of the package, and the elution of the monomer ingredient from the LLDPE used could not be perfectly restrained.

The invention claimed is:

1. A package with multiple chambers for medical use comprising:
    sealed peripheral edge parts as strong seal parts formed by sealing one sheet having a heat seal layer in at least one surface thereof and another sheet having a heat seal layer in at least one surface thereof wherein said heat seal layers face each other, and
    wherein the multiple chambers are partitioned by one or more weak seal parts that form one or more walls and that is made by heat-pressing from the outside of said package and bonding partly the inner surfaces of heat seal layers facing each other to form the walls of said package,
    wherein both of said two heat seal layers forming the inner surface of said walls include only cyclic polyolefin resins as a resin ingredient to prevent the package inner wall from absorbing or holding an ingredient contained therein, to prevent the elution of low molecular weight components through the package inner wall and to maintain moisture impermeability, and
    wherein at least one of said two heat seal layers forming the inner surfaces of said walls include, as a resin ingredient, a mixture of cyclic polyolefin resins alone which comprises (A) a cyclic polyolefin having a glass transition temperature of lower than 100° C. and (B) a cyclic polyolefin having a glass transition temperature of not lower than 100° C. to form the strong seal part and the weak seal part so as to function as a package with multiple chambers.

2. The package with multiple chambers as set forth in claim 1, wherein the mixing weight ratio (A)/(B) of said (A) cyclic polyolefin having a glass transition temperature of lower than 100° C. and said (B) cyclic polyolefin having a glass transition temperature of not lower than 100° C. is in the range of from 2/98 to 70/30.

3. The package with multiple chambers as set forth in claim 1, wherein the gap in glass transition temperature between said (A) cyclic polyolefin having a glass transition temperature of lower than 100° C. and said (B) cyclic polyolefin having a glass transition temperature of not lower than 100° C. is not lower than 20° C.

4. The package with multiple chambers as set forth in claim 1, wherein said cyclic polyolefin resin has a structural unit (1) and/or (2) represented by the following general formulas:

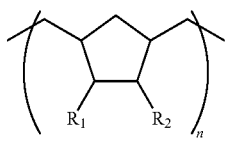
(1)

-continued

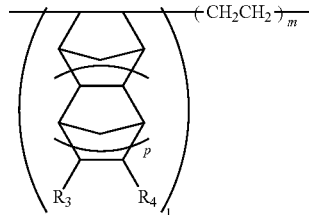
(2)

wherein $R_1$, $R_2$, $R_3$ and $R_4$ are the same or different organic groups having 1 to 20 carbon atoms, the pair of groups $R_1$ and $R_2$ and/or the pair of groups $R_3$ and $R_4$ may together form a ring, each of m and p is an integer of zero, and each of l and n is an integer of one or more.

5. The package with multiple chambers as set forth in claim 1, wherein said cyclic polyolefin resin is a polynorbornene resin.

6. A package with multiple chambers for medical use comprising:
    sealed peripheral edge parts as strong seal parts formed by sealing one sheet having a heat seal layer in at least one surface thereof and another sheet having a heat seal layer in at least one surface thereof wherein said heat seal layers face each other, and
    wherein the multiple chambers are partitioned by one or more weak seal parts that form one or more walls and that is made by heat-pressing from the outside of said package and bonding partly the inner surfaces of heat seal layers facing each other to form the walls of said package,
    wherein both of said two heat seal layers forming the inner surface of said walls include only cyclic polyolefin resins as a resin ingredient to prevent the package inner wall from absorbing or holding an ingredient contained therein, to prevent the elution of low molecular weight components through the package inner wall and to maintain moisture impermeability, and
    wherein said weak seal part is formed by inserting a tape between the facing inner surfaces of said walls; and heat-pressing and bonding the facing inner walls from the outside of said package, wherein the tape has in a surface layer thereof at least a layer comprising (A) a cyclic polyolefin resin having a glass transition temperature of lower than 100° C. and (B) a cyclic polyolefin resin having a glass transition temperature of not lower than 100° C. to form strong seal part and weak seal part so as to function as a package with multiple chambers.

7. The package with multiple chambers as set forth in claim 6, wherein the mixing weight ratio (A)/(B) of said (A) cyclic polyolefin having a glass transition temperature of lower than 100° C. and said (B) cyclic polyolefin having a glass transition temperature of not lower than 100° C. is in the range of from 2/98 to 70/30.

8. The package with multiple chambers as set forth in claim 6, wherein the gap in glass transition temperature between said (A) cyclic polyolefin having a glass transition temperature of lower than 100° C. and said (B) cyclic polyolefin having a glass transition temperature of not lower than 100° C. is not lower than 20° C.

9. The package with multiple chambers as set forth in claim 6, wherein said cyclic polyolefin resin has a structural unit (1) and/or (2) represented by the following general formulas:

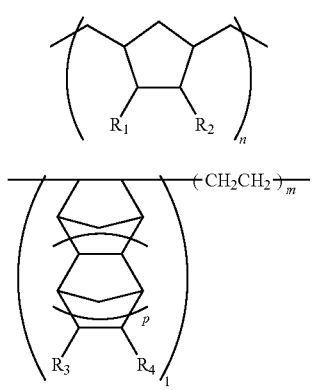 (1)

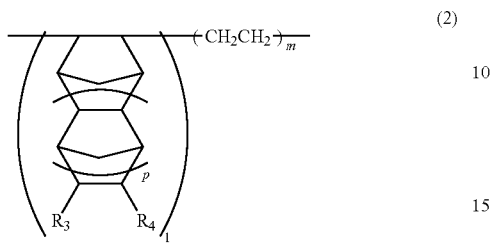 (2)

wherein $R_1$, $R_2$, $R_3$ and $R_4$ are the same or different organic groups having 1 to 20 carbon atoms, the pair of groups $R_1$ and $R_2$ and/or the pair of groups $R_3$ and $R_4$ may together form a ring, each of m and p is an integer of zero, and each of l and n is an integer of one or more.

10. The package with multiple chambers as set forth in claim 6, wherein said cyclic polyolefin resin is a polynorbornene resin.

* * * * *